United States Patent Office 3,384,669
Patented May 21, 1968

3,384,669
PROCESS AND CATALYST FOR OXIDIZING OLEFINS TO CARBONYL COMPOUNDS
Alexander F. MacLean and Adin L. Stautzenberger, Corpus Christi, Tex., assignors to Celanese Corporation of America, New York, N.Y., a corporation of Delaware
No Drawing. Continuation-in-part of application Ser. No. 212,440, July 25, 1962. This application Sept. 24, 1963, Ser. No. 311,197
11 Claims. (Cl. 260—597)

ABSTRACT OF THE DISCLOSURE

Ethylenically unsaturated aliphatic organic compounds are converted to their corresponding carbonyl (i.e. aldehyde or ketone) derivatives by oxidation with molecular oxygen in the presence of a catalyst which comprises an aqueous solution of varivalent noble metal ions in a higher valence state together with nitrate ions, nitrite ions, or a mixture of nitrate and nitrite ions.

---

This is a continuation-in-part application of application Ser. No. 212,440, filed July 25, 1962, and now abandoned.

This invention relates to the oxidation of compounds containing olefinic unsaturation to carbonyl compounds. It more particularly refers to a novel catalyst system for the oxidation of olefins to carbonyls.

This invention includes in one of its aspects, a process for oxidizing compounds containing olefinic unsaturation to carbonyl containing compounds. This oxidation process utilizes a catalyst comprising an aqueous solution of varivalent noble metal ions in a higher valence state and nitrate ions.

As used herein, the term noble metal is intended to include metals of the so-called platinum group, e.g. platinum, palladium, ruthenium, rhodium, iridium and osmium. This invention is not limited to the use of a single metal species but also includes the use of a combination of two or more noble metals. More specifically platinum, rhodium and especially palladium are particularly useful in this invention. This invention will be hereinafter described with reference to palladium as an example of noble metals which are useful in this process. A varivalent species is one which not only exists in more than one valence state but which also has the ability to be oxidized or reduced from one valence state to another.

This invention is applicable to olefins in general since it is based upon the oxidation of ethylenic unsaturation. Thus, for example, α-olefins, internal olefins such as 2-butene, and olefins containing other substituents such as styrene, methyl vinyl ketone, acrylic acid, acrolein, crotonaldehyde and oleic acid are all adopted to use in this invention. Further, olefins with polyunsaturation such as linolenic acid or butadiene are adopted to use in this invention.

According to one embodiment of this invention, an olefin is oxidized to a carbonyl compound by the reaction of the olefin with free oxygen in the presence of a catalyst comprising an aqueous solution of palladium II ions and nitrate ions which solution advantageously contains an organic coupling dipole solvent having a high dipole moment, is resistant to oxidation, and is miscible with both water and the olefin being oxidized. Preferably the coupling solvent has a dipole moment of at least about 1.0 or higher, optimumly above 1.6. Suitable dipole solvents for use in this invention are exemplified by acetic acid, propionic acid and acetonitrile. In contrast, it has been found that the inclusion of solvents having low dipole moments, such as p-dioxane, have little or no effect upon the reaction rate.

It has been found that the reaction here described, that is, oxygen oxidation of olefins to carbonyls, has an induction period, i.e. a period of time after start up of the process during which the reaction is coming to equilibrium. It has also been found that this induction period can be substantially reduced and in many cases completely eliminated by the inclusion of nitrite ion into the catalyst solution. Similarly, hydroxylamine, nitrogen dioxide, nitric oxide and ammonia act to dramatically shorten or eliminate the induction period of this reaction. The nitrite ion, hydroxylamine, ammonia, nitrogen dioxide, nitric oxide or similar material should be incorporated in the catalyst solution in a proportion of about 2 moles per mole of palladium. It is desirable to carry out this invention on the acid side, preferably at a pH of at most about 3. Toward this end, it is desirable to include nitric acid in the catalyst solution of this invention. It is particularly preferred to maintain the nitric acid concentration below about 0.1 Molar.

It has been determined that the relative rate of oxidation of olefin to carbonyl is directly proportional to the concentration of palladium and nitrate ions initially present in the catlyst solution. Thus, at an initial palladium nitrate concentration of $2.2 \times 10^{-3}$ Molar, the oxygen absorption rate was 0.25 parts by volume per 50 parts by volume of solution per minute. At an initial palladium nitriate concentration of $3.47 \times 10^{-2}$ Molar, the oxygen absorption rate rose to 3.72 parts by volume per 50 parts by volume of solution per minute. Since the relative reaction rate is directly proportional to the initial palladium nitrate concentration, theoretically the higher the palladium nitrate initial concentration, the higher is the reaction rate. Practically, 0.01 Molar palladium nitrate has been found to give an adequately high reaction rate for most purposes. The palladium nitrate concentration can suitably range from 0.001 Molar up to the limit of solubility. It is preferred to utilize an initial palladium nitrate concentration of about 0.01 to 0.05 Molar.

It is within the spirit and scope of this invention to provide an aqueous solution of palladium ions and nitrate ions by dissolving palladium nitrate in water, preferably with a dipole solvent added. It is also proper to dissolve metallic palladium in an aqueous nitric acid solution. Further, palladium ions and nitrate ions can be introduced separately such as by dissolving palladium acetate and ferric nitrate in water. It is not necessary that the concentrations of palladium ion and of nitrate ion be equal. Thus palladium nitrate and nitric acid may both be dissolved in water to provide a catalyst solution.

It is one attribute of this invention that it is not necessary or even desirable to provide halogen, and particularly chloride, ions in the instant catalyst system. Further, it is not necessary or even desirable to provide a secondary oxidizing metal, such as copper II, in order to prevent the precipitation of metallic palladium. Either chloride ions or copper ions may however be present in such proportions as not to interfere with process of this invention. It is within the spirit and scope of this invention, however, to include ions in the catalyst system other than palladium and nitrate if desired. Thus, other anions and/or cations which have no detrimental effect upon the catalysis herein disclosed may be present in the catalyst system.

Olefins which are adapted to oxidation to carbonyls with the aid of catalyst systems according to this invention include ethylene, propylene, butene, octene and other similar compounds. This invention is generally applicable to all olefins. These may be mono- or poly-unsaturated and the olefins may be hydrocarbons, either aliphatic or aromatic, or other ethylenically unsaturated aliphatic organic compounds, such as for example carboxylic acids, ketones, ethers, aldehydes or esters in the molecules of which the aliphatic moieties are all hydrocarbon. This invention is applicable to the oxidation of olefins dissolved in a catalytic solution or to olefins in the gaseous state mixed with an oxygen containing gas and the mixture contacted with a catalytic solution. This invention is particularly applicable to the oxidation of olefins which are difficultly soluble in aqueous systems, e.g. higher olefins having at least about 5 carbon atoms.

Oxidation of olefins according to this invention is suitably carried out at about 0 to 150° C. at pressures ranging from 1 to 50 atmospheres. It is preferred to operate between 20 to 90° C. and 1 to 5 atmospheres but these conditions will of course vary with the particular olefin being oxidized and with the particular oxygen containing gas utilized. Oxidizing gases include oxygen, air, air enriched with oxygen and artificial mixtures of oxygen and other gases which are inert to the oxidation system under consideration. This oxidation process can be carried out batchwise or continuously as desired.

The following specific examples are given by way of further illustrating preferred embodiments of this invention but are in no way limiting upon the scope of this invention.

Example I

A 50 cubic centimeter aqueous solution containing 80 volume percent acetic acid was made $8.6 \times 10^{-3}$ Molar in palladium nitrate and $1.4 \times 10^{-2}$ Molar in nitric acid. The solution was blanketed with oxygen at 20° C. and atmospheric pressure, and 6.316 millimoles of octane-1 was added to the catalyst solution. Oxygen was absorbed by the solution over a period of 45 minutes to a total of 1.2 millimoles. The product was analyzed to contain almost the theoretical quantity of octanone-2 (2.4 millimoles ±5%).

Example II

A cylindrical reactor having a length to diameter ratio of about 8 to 1 was charged with 275 cubic centimeters of an aqueous solution containing 70 volume percent acetic acid. The aqueous solution was made 0.0022 Molar in palladium nitrate and 0.1 Molar in nitric acid and oxygen was sparged in at the bottom of the reactor at a rate of 380 cubic centimeters per minute at atmospheric pressure and a temperature of 28° C. Ethylene gas was also sparged into the bottom of the reactor at a rate of 120 cubic centimeters per minute at atmospheric pressure and a temperature of 20° C. After allowing the reaction to proceed for 100 minutes, 2.1 parts by weight of acetaldehyde were recovered as acetaldoxime by passing the effluent gas through an hydroxylamine solution.

Example III

A 100 cubic centimeter aqueous solution containing 80 volume percent acetic acid was made $2.8 \times 10^{-2}$ Molar in palladium nitrate, $5.0 \times 10^{-2}$ Molar in ferric nitrate, and $2.2 \times 10^{-1}$ Molar in nitric acid. The solution was blanketed with oxygen at 26 to 45° C. for 5 hours at atmospheric pressure during which time 0.134 mole of octene-1 were fed to the system with 0.126 mole of octene-1 and 0.059 mole of oxygen being converted. The product was 0.103 mole of 2-octanone at an efficiency of 82 percent.

Example IV

The experiment described in Example I was repeated using acetonitrile as the coupling solvent. The reaction rate and efficiency found were the same as those of Example I.

A further aspect of this invention includes the use of a metal ion as defined above in the presence of a nitrite ion as the catalyst system for oxidizing an olefinic compound to its corresponding carbonyl compound. The following example is given to illustrate this aspect of this invention.

Example V

An aqueous solution of palladium nitrite was prepared and blanketed with oxygen for six hours at atmospheric pressure. During these six hours, 1-pentene was fed to the system and was oxidized to 2-pentanone. During the first 40 minutes of the reaction, 0.04 mole of 2-pentanone was formed per liter of solution. During the whole six hour period, 0.06 mole of 2-pentanone per liter was formed.

This specification has been submitted by way of example only. Nothing contained herein should be construed as limiting upon this invention.

The embodiments of the invention in which an exclusive property or privilege is claimed are defined as follows:

1. The process of oxidizing an unsaturated organic compound to a carbonyl compound which is a member of the group consisting of aldehydes and ketones, said unsaturated organic compound being a member of the group consisting of olefinic hydrocarbons and ethylenically unsaturated aliphatic compounds which are members of the group consisting of carboxylic acids, ketones, and aldehydes and in which the aliphatic moieties are all hydrocarbon, which process comprises contacting said unsaturated organic compound with a free oxygen containing gas and a catalyst consisting essentially of an aqueous solution of varivalent noble metal ions in a higher valence state and nitrate ions.

2. The process claimed in claim 1, wherein said noble metal is palladium.

3. The process claimed in claim 1 carried out at about 0 to 150° C. at about 1 to 50 atmospheres.

4. The process claimed in claim 2, wherein said palladium ions and said nitrate ions are each present in concentrations of at least about 0.001 Molar.

5. The process which comprises contacting an organic compound containing olefinic unsaturation with a free oxygen containing gas and an aqueous catalytic medium containing varivalent noble metal ions in a higher valence sate, nitrate ions and nitrite ions, said unsaturated organic compound being a member of the group consisting of olefinic hydrocarbons and ethylenically unsaturated aliphatic compounds which are members of the group consisting of carboxylic acids, ketones, and aldehydes and in which the aliphatic moieties are all hydrocarbon.

6. The process claimed in claim 5 including providing a catalyst comprising an aqueous solution of palladium ions, nitrate ions and an organic coupling solvent miscible with both water and said unsaturated organic compound, said coupling solvent being a liquid which is not readily oxidized and has a dipole moment of at least about one.

7. The process claimed in claim 5, wherein said varivalent noble metal ion and said nitrate ion are present in a concentration of about 0.01 to 0.05 Molar.

8. A process as claimed in claim 5, wherein said medium contains a polar solvent and has a high dipole moment.

9. A process as claimed in claim 5, wherein said unsaturated organic compound contains at least about 5 carbon atoms.

10. In a process of oxidizing an olefin unsaturated organic compound to its corresponding carbonyl compound with molecular oxygen, said carbonyl compound being a member of the group consisting of aldehydes and ketones and said unsaturated organic compound being a member of the group consisting of olefinic hydrocarbons and ethylenically unsaturated aliphatic organic compounds which are members of the group consisting of carboxyl acids, ketones, and aldehydes and in which the aliphatic moieties are all hydrocarbon: the improvement which comprises catalyzing this reaction with an aqueous solution of varivalent noble metal ions in a higher valence state and nitrite ions.

11. The process claimed in claim 10 wherein the noble metal is palladium.

References Cited

UNITED STATES PATENTS

| 3,076,032 | 1/1963 | Riemenschneider et al. | 260—597 |
| 3,080,425 | 3/1963 | Smidt et al. | 260—597 |
| 3,144,488 | 8/1964 | Smidt et al. | 260—597 |

FOREIGN PATENTS

| 876,024 | 8/1961 | Great Britain. |

DANIEL D. HORWITZ, *Primary Examiner.*

L. ZITVER, *Examiner.*